Nov. 20, 1962 C. H. KRAUSE 3,065,439

UNIVERSAL CIRCUITS INTERCONNECTOR

Filed July 1, 1959

2 Sheets-Sheet 1

Inventor:
Carl H. Krause
By Roy Griffith Jones
Attorney

Nov. 20, 1962 C. H. KRAUSE 3,065,439

UNIVERSAL CIRCUITS INTERCONNECTOR

Filed July 1, 1959 2 Sheets-Sheet 2

Inventor:
Carl H. Krause
By. Roy Griffith Jones
Attorney

United States Patent Office 3,065,439

Patented Nov. 20, 1962

3,065,439
UNIVERSAL CIRCUITS INTERCONNECTOR

Carl H. Krause, Brooklyn, N.Y., assignor to Associated Products and Service Company, Long Branch, N.J., a corporation of New Jersey Filed July 1, 1959, Ser. No. 824,316
1 Claim. (Cl. 339—18)

This invention relates to a structure for selectively connecting one or more electric circuits, of a given series of circuits, with one or more circuits of another series of electric circuits.

One of the objects accomplished by the present invention is the provision of a simple structure whereby any one or more incoming circuits of a series may be quickly connected to, and disconnected from, one or more circuits of an outgoing series, without the use of undesirable cords, switches, relays, etc., and in a manner not limiting its range in either direction as to voltage, current or frequency, and in series, parallel, or series-parallel relation.

It is known that a large number of interconnected electric circuits are required for modern automation, and that the pattern of these connections must be changed more or less frequently to adapt to different operational requirements. Present means for changing connections are expensive, complicated, require skilled technicians, are time-consuming, and are frequently limited as to the voltage, current, or frequency at which they are operable, while the present invention has the opposite qualities, and moreover eliminates the possibility of short circuiting.

The structure of the present invention, although very simple, is such that there is no pattern of circuitry that can't be accomplished by using of one or more units in association.

The invention is useful in power stations, substations, missile control stations, automatic processing factories and for machines electrically controlled, in fact, wherever there is a need for interconnection between circuits which need more or less frequent changes of connections.

Broadly, the invention is a device for selectively interconnecting electrical circuits, comprising a first and a second series of electrical conductors, one series being behind and transverse to the other series, the conductors of each series having openings at the positions of crossing the other series, corresponding openings being in alignment and adapted to receive a single straight electrical connector.

The invention also includes an arc-extinguishing dielectric.

The drawings illustrate the invention, and in these:

Figure 1:
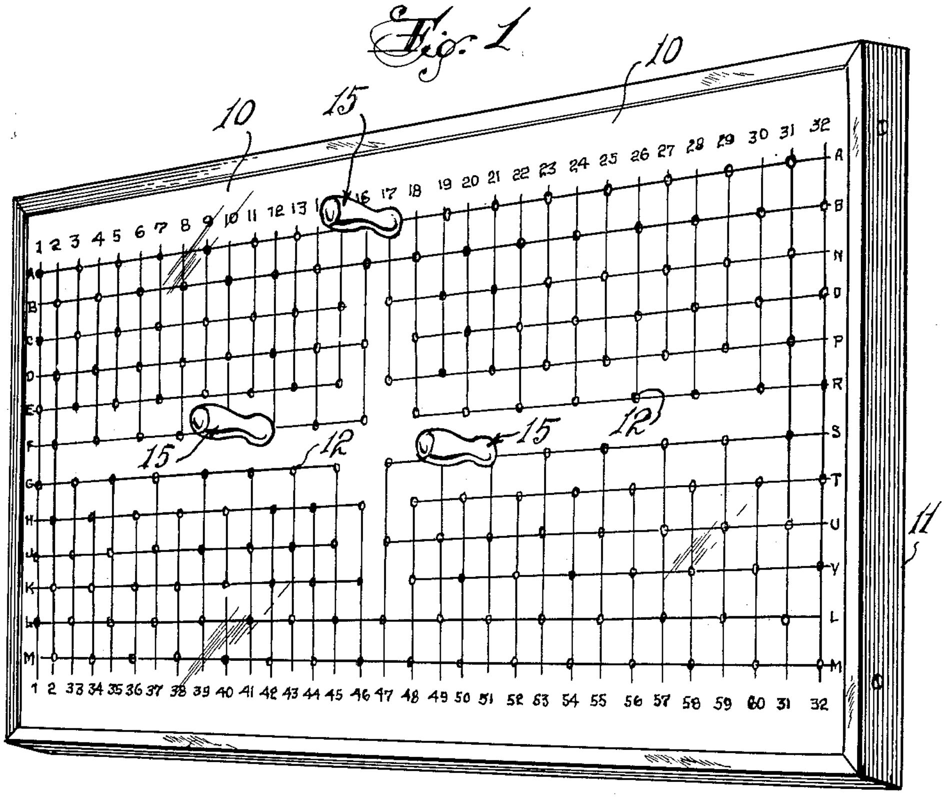
FIGURE 1 is a perspective view of the device, showing on its face a diagram of electrical conductors back of it.

Referring to the drawings for a more detailed description, FIG. 1 shows a front sheet 10 bearing a printed diagram, to indicate the relations of a horizontal and a vertical series of conductors disposed back of the diagram and held, with other components, and sheet 10 itself, within frame 11. Sheet 10 has apertures 12 at many of the apparent intersections of the horizontal and vertical conductors, so that tapered plugs 15 (FIG. 3) may be passed therethrough and into conductors represented on the diagram to form electrical connections. It will be seen that vertical conductors are indicated on the diagram by numerals and horizontal conductors by letters, this for convenience in plugging in the right connections, as according to instructions, for example. The specific arrangement of conductors indicated in the diagram provides for a large number of interconnections, but it is to be understood that this is illustrative only and that any other configuration may be made.

Figure 2:
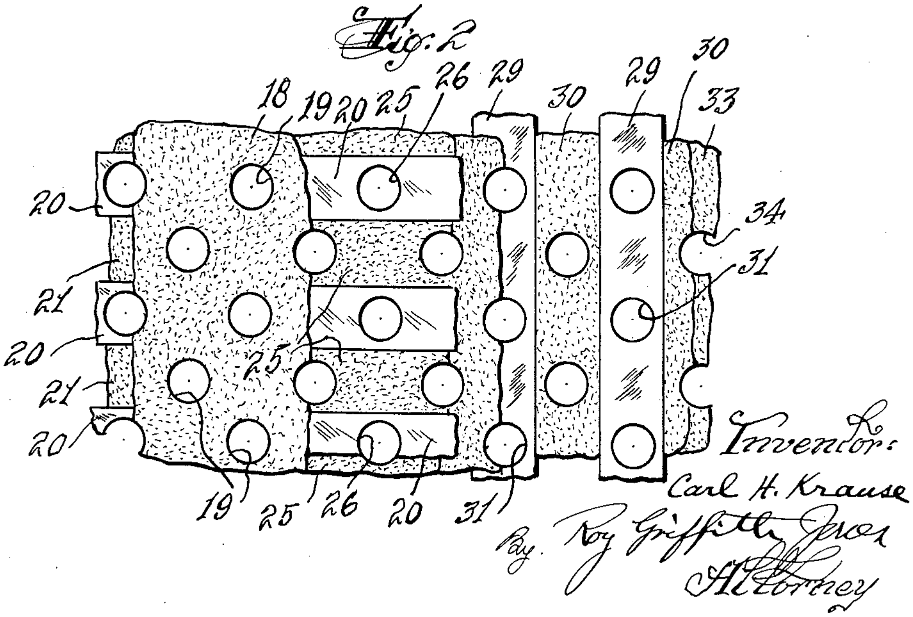
FIG. 2 is a fragmentary plan view broken away to show the various layers of components.
Figure 3:
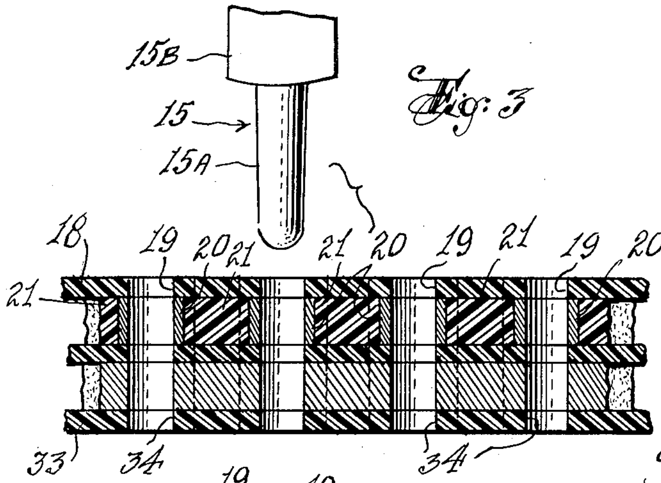
FIG. 3 is a composite figure showing a connecting plug fragmentarily in elevation and a partial section of the component layers behind the front diagram.
Figure 4:
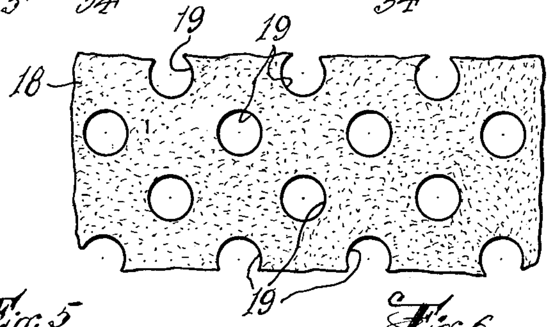
FIG. 4 is a fragmentary plan view of the front sheet of insulating material.
Figure 9:
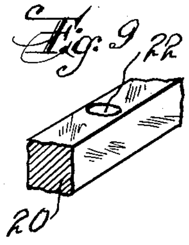
FIG. 9 is a perspective of part of an apertured conductor, as used in the horizontal and vertical series hereinafter described.
Figure 5:
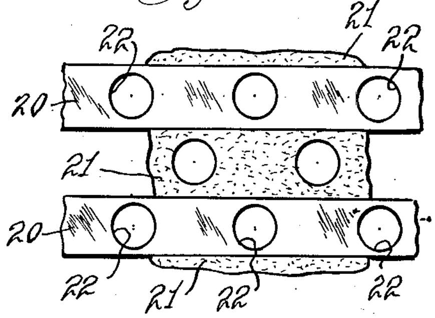
FIG. 5 is a fragmentary plan view showing apertured conductors and insulation.
Figure 6:
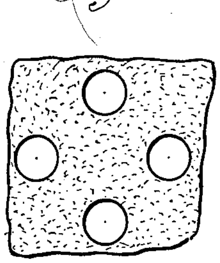
FIG. 6 is a partial plan view of a sheet of apertured insulation used between the vertical and horizontal series of conductors.
Figure 7:
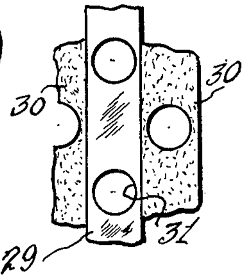
FIG. 7 is a fragmentary plan of a vertical conducting bar, with plug apertures, and insulating strips at each side thereof.
Figure 8:
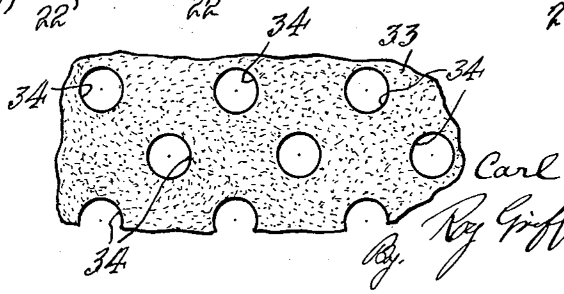
FIG. 8 is a view showing part of the apertured rear insulating sheet.

Back of the diagram sheet 10, there is a sheet of insulating material 18, having apertures 19 therethrough from face to face, as shown in FIGS. 2, 3 and 4, and in line with apertures 12, and back of sheet 18 there is a series of spaced, parallel, horizontal conducting bars 20 with strips 21 of insulating material spacing them, and apertures 22 therethrough in alignment with apertures 19 of sheet 18. Back of the series of horizontal conducting bars 20 there is a sheet 25 of insulating material with apertures 26 in alignment with the previously mentioned apertures. A series of spaced, parallel vertical bars 29, with vertical insulating strips 30 therebetween, is disposed back of insulating sheet 25, and each bar has an aperture 31 therethrough in alignment with the previously mentioned apertures, or, in other words, at the cross over points relative to the horizontal conductors. A rear sheet 33 of insulating material is positioned back of the vertical bars, with openings 34 in alignment with the openings in front thereof.

Connector plugs 15, as shown in FIGS. 1 and 3, and comprising a tapered metallic portion 15A and an insulating handle 15B, are inserted into the aligned apertures to selectively connect the proper horizontal bars with the proper vertical bars, either series of bars being parts of incoming circuits and the other series being parts of outgoing circuits.

The mentioned insulating material used may be of any suitable type, but I prefer to use a phenolic resin containing fibre glass and coated with a mixture consisting of an epoxy resin and a silicone resin, in the proportion of 95%–85% of the former to 5%–15% of the latter, as I have found that this coating has an arc-extinguishing characteristic.

It will thus be seen that the stated advantages of the invention have been attained.

Various changes may be made in the device as illustrated without departing from the inventive concept. For example, the shape or cross section of the connecting plug and connector openings may be changed and plugs of different shapes may be used, each keyed to a given opening. The connecting plugs may also be held mechanically and operated electrically by remote control for their insertion into and withdrawal from said openings.

What is claimed is:

For use with a plurality of different power circuits for placing selective ones of said power circuits in electrical conduction with a plurality of work circuits, a cross grid unit comprising two series of parallel, electrically conducting bars capable of conducting high currents, one of the series being behind and crossing over the other series, insulating strips between and contacting the bars of each series and insulating sheets between and covering and contacting the two said series, said bars and insulating sheets having a plurality of holes at the cross-over points of the bars and open to receive a connector, elongate, tapered, cross-sectionally circular, smooth-surfaced electrical connectors adapted to be received through said holes at predetermined connecting points and held only frictionally therein, a resinous coating having arc extinguishing characteristics on said insulating strips and sheets as the means to hold said sheets, bars and strips together, and a circuit diagram on the front insulating sheet showing the relations of the two series of bars to power circuits and said work circuits.

References Cited in the file of this patent

UNITED STATES PATENTS

| | | |
|---|---|---|
| 252,395 | Odell | Jan. 17, 1882 |
| 2,192,045 | Linde | Feb. 27, 1940 |
| 2,526,448 | Amundson et al. | Oct. 17, 1950 |
| 2,613,287 | Geiger | Oct. 7, 1952 |
| 2,746,680 | Maul | May 22, 1956 |
| 2,932,772 | Bowman et al. | Apr. 12, 1960 |

FOREIGN PATENTS

| | | |
|---|---|---|
| 248,616 | Great Britain | Mar. 11, 1926 |